US009256076B2

(12) United States Patent
Watanabe et al.

(10) Patent No.: US 9,256,076 B2
(45) Date of Patent: Feb. 9, 2016

(54) IMAGE DISPLAY DEVICE (71) Applicant: Panasonic Intellectual Property Corporation of America, Torrance, CA (US)

(72) Inventors: Tatsumi Watanabe, Osaka (JP); Ken Mashitani, Osaka (JP); Nobuyuki Kunieda, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 29 days.

(21) Appl. No.: 14/131,292

(22) PCT Filed: May 22, 2013

(86) PCT No.: PCT/JP2013/003255
§ 371 (c)(1),
(2) Date: Jan. 7, 2014

(87) PCT Pub. No.: WO2013/175785
PCT Pub. Date: Nov. 28, 2013

(65) Prior Publication Data
US 2014/0152927 A1 Jun. 5, 2014

(30) Foreign Application Priority Data

May 23, 2012 (JP) ................................ 2012-117585

(51) Int. Cl.
*G02F 1/1335* (2006.01)
*G02B 27/22* (2006.01)

(52) U.S. Cl.
CPC ...... *G02B 27/2214* (2013.01); *G02F 1/133512* (2013.01); *G02F 1/133526* (2013.01)

(58) Field of Classification Search
CPC .................................................. G02B 27/2214
USPC .......... 349/15; 345/613; 359/463; 348/51, 59
See application file for complete search history.

(56) References Cited

U.S. PATENT DOCUMENTS 6,064,424 A 5/2000 van Berkel et al.
6,118,584 A 9/2000 Van Berkel et al.
(Continued)

FOREIGN PATENT DOCUMENTS

| JP | 9-236777 | 9/1997 |
| JP | 10-505689 | 6/1998 |
| JP | 2005-309374 | 11/2005 |
| JP | 2007-17635 | 1/2007 |

(Continued)

OTHER PUBLICATIONS

International Search Report issued Aug. 20, 2013 in International (PCT) Application No. PCT/JP2013/003255.

*Primary Examiner* — Thanh-Nhan P Nguyen
(74) *Attorney, Agent, or Firm* — Wenderoth, Lind & Ponack, L.L.P.

(57) ABSTRACT

Many pixels (11) are laid out in horizontal and vertical directions on liquid crystal panel (10). There is black matrix (12) between them not to display images. Lenticular lenses (20) are set so that lenticular lenses are inclined at a predetermined angle to vertical direction of liquid crystal panel. Observer observes linear observation region (21) indicated by dotted line through lenticular lenses from predetermined viewpoint. Pixels of liquid crystal panel are parallelograms. Straight line connecting lower right vertex of target pixel to lower left vertex of immediately right pixel is angularly coincide with the observation region. In this way, straight line connecting lower right vertex of target pixel to lower left vertex of immediately right pixel angularly coincides with the lenticular lenses. Consequently, brightness on a screen visible through lenticular lenses becomes constant irrespective of position of observer, which results in reduced moire.

8 Claims, 10 Drawing Sheets

(56) References Cited

U.S. PATENT DOCUMENTS

| | | |
|---|---|---|
| 2005/0083246 A1 | 4/2005 | Saishu et al. |
| 2007/0188517 A1* | 8/2007 | Takaki .......................... 345/613 |
| 2008/0079662 A1* | 4/2008 | Saishu et al. .................... 345/55 |
| 2008/0316379 A1 | 12/2008 | Zuidema et al. |
| 2010/0259697 A1 | 10/2010 | Sakamoto et al. |

FOREIGN PATENT DOCUMENTS

| | | |
|---|---|---|
| JP | 4015090 | 11/2007 |
| JP | 2008-92361 | 4/2008 |
| JP | 2009-519497 | 5/2009 |
| JP | 2010-249954 | 11/2010 |

* cited by examiner

IMAGE DISPLAY DEVICE

TECHNICAL FIELD

The present invention relates to an image display device including image display means, and image separation means for separating a region in which images displayed by the image display means are observed.

BACKGROUND ART

Conventionally, lenticular lens systems have been known as image display techniques for presenting an observer with a 3D (three-dimensional) image by separating a region in which images displayed by image display means are observed (e.g. Patent Document 1).

An image obtained by combining images of an object captured from a few directions is displayed on a liquid crystal panel as the image display means. Lenticular lenses as image separation means are situated in front of the liquid crystal panel. The lenticular lenses are inclined at a predetermined angle to a vertical axis of the image display panel. An observer observes the liquid crystal panel through the lenticular lenses. Observed portions of the liquid crystal panel are changed by positions of eyes due to effects of the lenses. Consequently, a region in which each viewpoint image is visible is separated, so that the left and right eyes of the observer observe the image from different viewpoints. The brain of the observer recognizes the image as a 3D image due to parallax of both eyes as a difference between the different viewpoint images.

A positional relationship among the liquid crystal panel, the lenticular lenses and a viewpoint of the observer causes a change in observation region on the liquid crystal panel observed from a viewpoint through the lenticular lenses. There are a region of pixels and a region of a black matrix formed by electrodes and alike on the liquid crystal panel.

Figure 15:
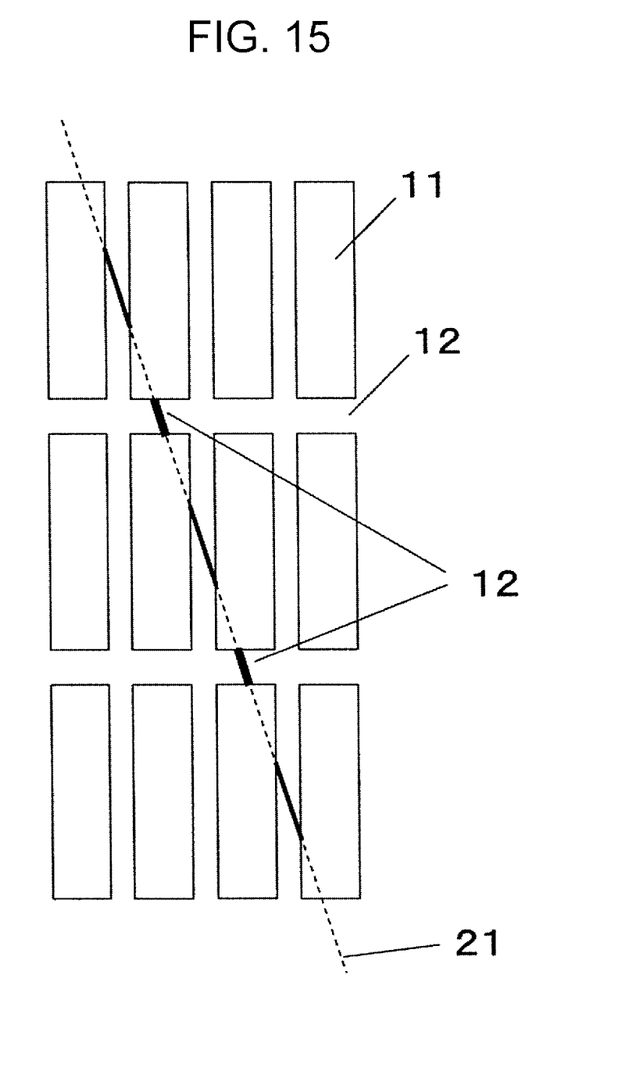
FIG. 15 is a view showing an exemplary non-luminous region on an observation region according to conventional arts.

FIG. 15 is a schematic view of a part of pixels of a liquid crystal panel as image display means according to conventional arts. In FIG. 15, many pixels 11 are arranged in the horizontal direction and the vertical direction on the liquid crystal panel. A region other than the pixels 11 is a black matrix 12 in which black pigments are coated after formation of electrodes and alike not to display images. Lenticular lenses (not shown) are inclined at a predetermined angle to the vertical direction of the liquid crystal panel.

An observer observes a linear observation region 21, which is indicated by the dotted line, from a viewpoint through the lenticular lenses. FIG. 15 shows a state that the observation region 21 passes through a middle of the pixels 11 of the liquid crystal panel. In FIG. 15, the observation region 21 bridging between adjacent pixels in the horizontal direction is superposed with the black matrix 12. This region is indicated by the thick lines. The observation region 21 bridging between adjacent pixels in the vertical direction is also superposed with the black matrix 12. This region is indicated by the bold lines. Because the black matrix 12 is a region without image light emission, the region superposed with the observation region 21 is a non-luminous region.

Figure 16:
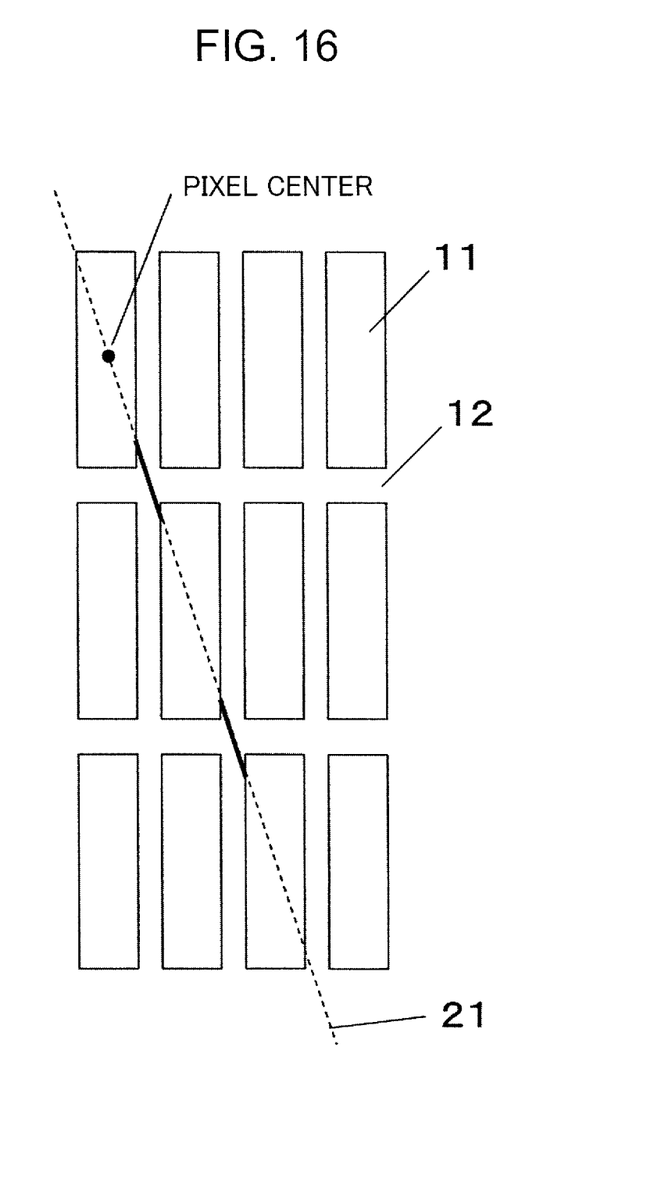
FIG. 16 is a view showing an exemplary non-luminous region on an observation region according to conventional arts.

FIG. 16 shows a state that a position of the observation region 21 on the liquid crystal panel moves so that the observation region 21 passes through a center (the black dot) of a pixel 11 of the liquid crystal panel. The observation region 21 bridging between the pixels 11 is superposed with the black matrix 12. This region is indicated by the thick lines. The superposed region is also a non-luminous region.

A total length of the non-luminous regions in FIG. 15 is longer than a total length of the non-luminous regions in FIG. 16. Specifically, a total length of the thick lines in FIG. 15 is as long as a total length of the thick lines in FIG. 16. The total length of the non-luminous regions in FIG. 15 is longer than the total length of the non-luminous regions in FIG. 16 by a total length of the bold lines 13. Therefore, a screen in FIG. 15 is darker than a screen in FIG. 16. This means that brightness of an observed screen is changed by a position of the observer to cause moire, which results in degraded quality of 3D images.

Patent Document 1: JP H09-236777 A

SUMMARY OF THE INVENTION

The present invention solves the aforementioned problems, and has an object of providing an image display device configured to reduce moire which occurs between image display means and image separation means.

An image display device according to one aspect of the present invention has parallelogram pixels which form image display means. A straight line that connects a lower right vertex of a target pixel to a lower left vertex of an immediately right pixel angularly coincides with a lenticular lens as image separation means.

The image display device has pixels of a display panel formed in a shape of making constant brightness on a screen visible through the separation means such as lenticular lenses irrespective of an observation position. The shape may advantageously reduce moire when an observer observes the image display device.

The object, characteristics, and advantages of the present invention become clear from the following detailed description and accompanying drawings.

DESCRIPTION

Hereinafter, image display devices according to embodiments of the present invention are described with reference to the drawings. In the following description of the drawings, identical or similar portions are attached with the same or similar reference symbols.

<Outline of Embodiments>

An image display device according to the embodiments includes image display means, and image separation means for separating a region in which images displayed by the image display means are observed. The image display device displays a stereoscopic image. The image display device is a liquid crystal panel for modulating light with a polarization plate and liquid crystals. The image separation means is a lenticular lens in which many semi-cylindrical lenses arranged in a stripe pattern.

In the embodiments, shapes of pixels of the liquid crystal panel are determined on the basis of a layout of the lenticular lens. Specifically, the pixels are formed in shape to provide constant brightness on a screen irrespective of a position of an observer. Accordingly, moire may be reduced when the observer observes the image display device.

<First Embodiment>

Image Display Device

Figure 1:
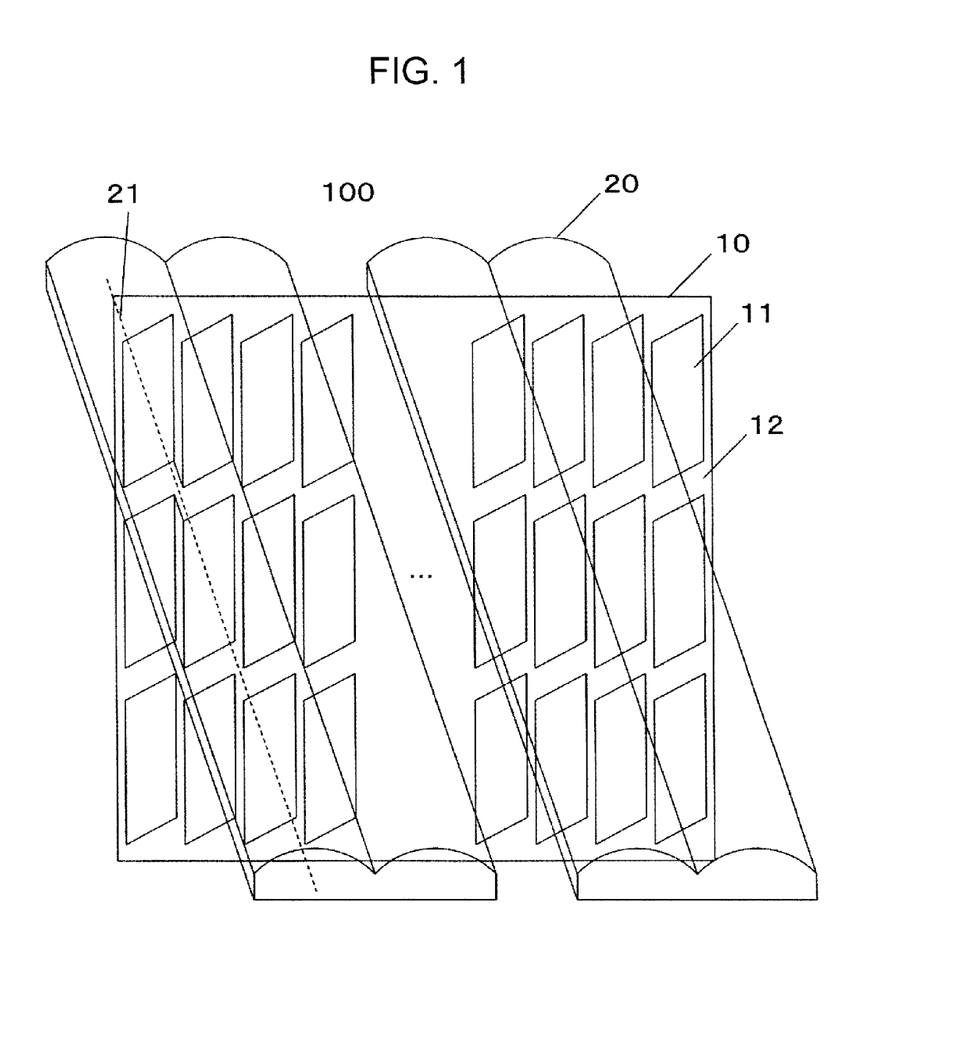
FIG. 1 is a view showing an image display device 100 according to the first embodiment.

Hereinafter, an image display device according to the first embodiment is described with reference to the drawings. FIG. 1 is a view showing the image display device 100 according to the first embodiment.

As shown in FIG. 1, the image display device 100 has a liquid crystal panel 10 as the image display means, and lenticular lenses 20 as the image separation means.

A lot of the pixels 11 are arranged in the horizontal direction and the vertical direction on the liquid crystal panel 10. A region other than the pixels 11 is the black matrix 12 in which black pigments are coated after formation of electrodes and alike not to display images. The lenticular lenses 20 are inclined at a predetermined angle to the vertical direction of the liquid crystal panel 10.

An observer observes a linear observation region 21, which is indicated by the dotted line, from a viewpoint through the lenticular lenses 20. An actual observation region may not be linear, but has a width because of aberration of the lenses. In this case, the actual observation region may be considered as a group of a lot of gathered observation regions 21. Or, an actual observation region may have a width under intentional design of lenses to be defocused. In this case, the actual observation region may be considered as a group of a lot of gathered observation regions 21.

Each of the pixels 11 of the liquid crystal panel 10 is a parallelogram. A straight line that connects a lower right vertex of a certain pixel to a lower left vertex of an immediately right pixel angularly coincides with the observation region 21. In other words, the straight line that connects a lower right vertex of a certain pixel to a lower left vertex of an immediately right pixel angularly coincides with the lenticular lens 20.

A position of the observation region 21 on the liquid crystal panel 10 is changed by a positional relationship among the liquid crystal panel 10, the lenticular lens 20 and a viewpoint of an observer. FIGS. 2 to 5 show positions of the observation region 21 on the liquid crystal panel 10 in four cases under different positional relationships among the liquid crystal panel 10, the lenticular lens 20 and a viewpoint of the observer.

Figure 2:
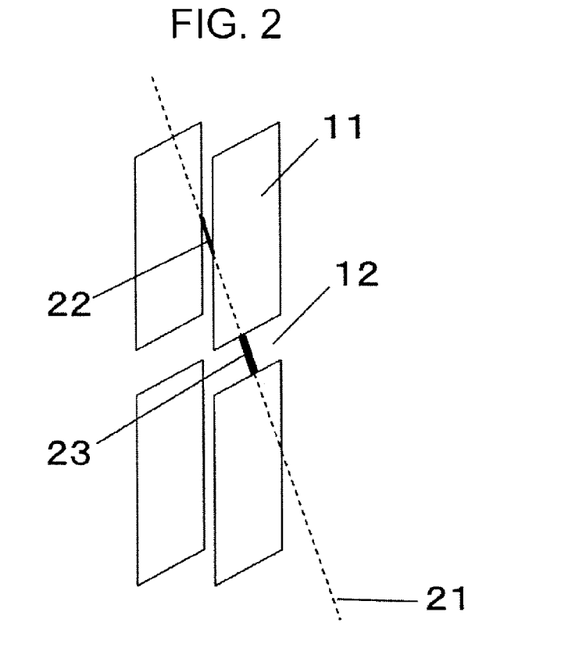
FIG. 2 is a view showing an exemplary non-luminous region on an observation region according to the first embodiment.

FIG. 2 shows a state that the observation region 21 passes through a middle of pixels 11 of the liquid crystal panel 10. In FIG. 2, the observation region 21 bridging between adjacent pixels in the horizontal direction is superposed with the black matrix 12. Since the black matrix 12 is a region without image light emission, this region is referred to as the first non-luminous region 22. The observation region 21 bridging between adjacent pixels in the vertical direction is superposed with the black matrix 12. This region is referred to as the second non-luminous region 23.

Figure 3:
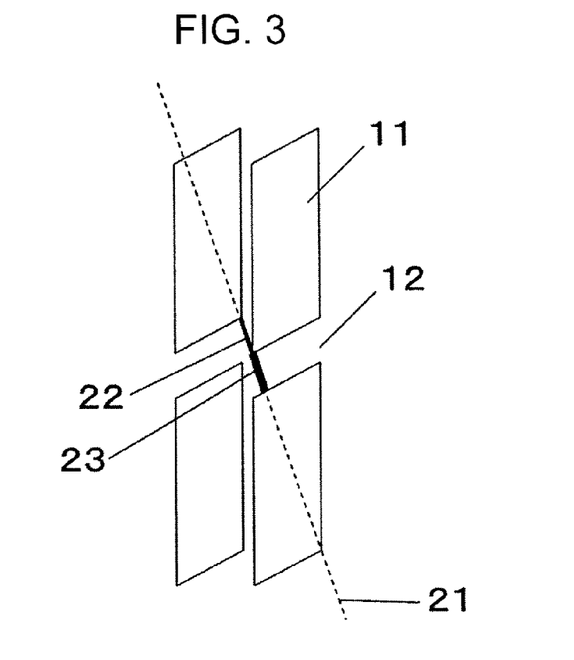
FIG. 3 is a view showing an exemplary non-luminous region on an observation region according to the first embodiment.

FIG. 3 shows a state that a position of the observation region 21 on the liquid crystal panel 10 moves to connect the first non-luminous region 22 to the second non-luminous region 23.

Figure 4:
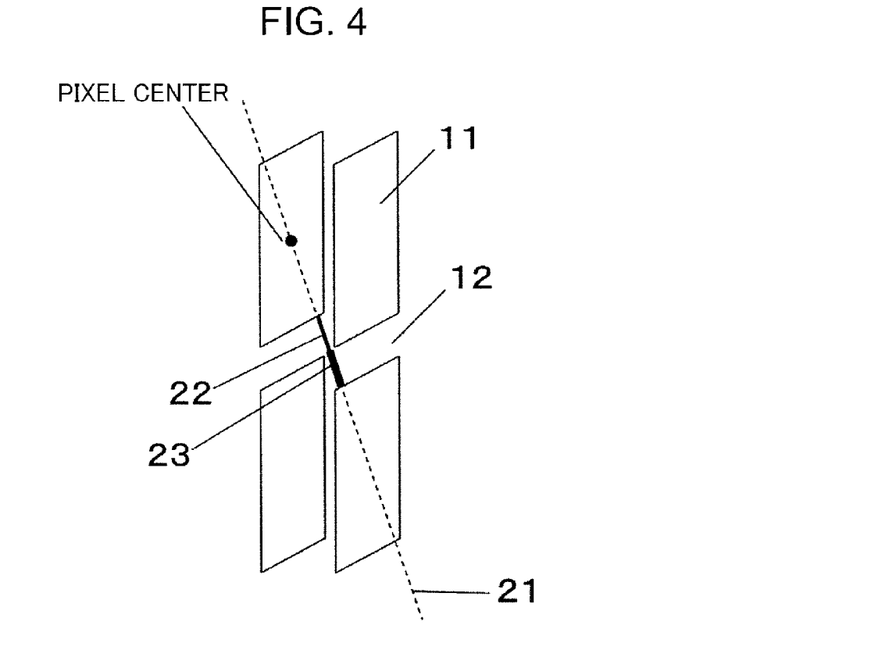
FIG. 4 is a view showing an exemplary non-luminous region on an observation region according to the first embodiment.

FIG. 4 shows a state that a position of the observation region 21 on the liquid crystal panel 10 further moves, so that the observation region 21 passes through a center (the black dot) of a pixel 11 of the liquid crystal panel 10. The non-luminous regions are as long as a total length of the first and second non-luminous regions 22, 23 in FIG. 3.

Figure 5:
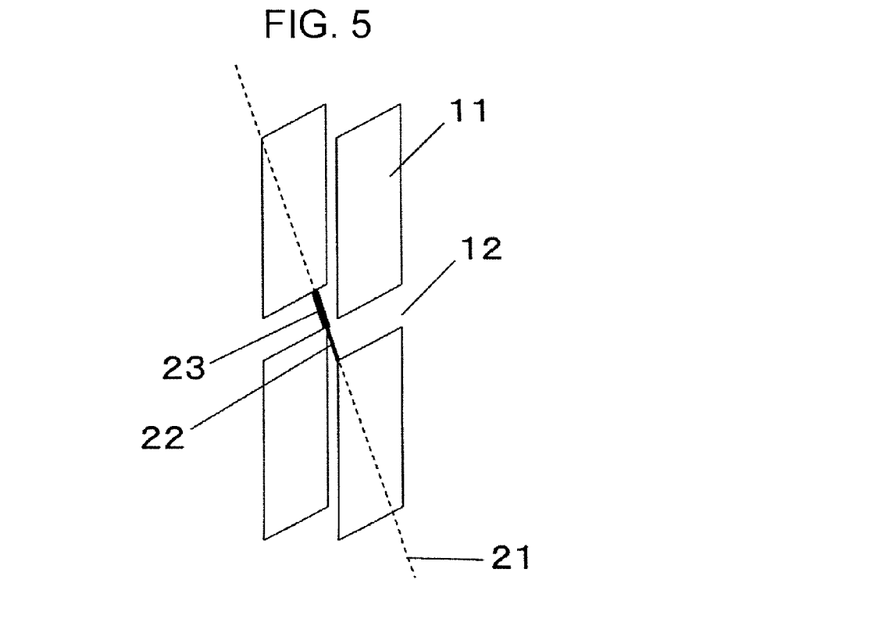
FIG. 5 is a view showing an exemplary non-luminous region on an observation region according to the first embodiment.

FIG. 5 shows a state that a position of the observation region 21 on the liquid crystal panel 10 further moves, so that the first non-luminous region 22 starts to be apart from the second non-luminous region 23. The non-luminous regions are as long as the total length of the first and second non-luminous regions 22, 23 in FIG. 3.

As described above, a length of the non-luminous regions is constant irrespective of a position of the observation region 21. In short, bright and dark stripes are less likely to occur under positional relationship in FIGS. 2 to 5.

Depending on a position of the observer, the states in FIGS. 2 to 5 may be mixed in a screen. Since there are few bright and dark stripes in this case, moire is reduced. In short, irrespective of a positional relationship among the liquid crystal panel 10, the lenticular lenses 20 and a viewpoint of the observer, moire is reduced without bright and dark stripes in a screen.

(Work and Effect)

In the first embodiment, shapes of the pixels 11 of the liquid crystal panel 10 are determined on the basis of a layout of the lenticular lenses 20. Specifically, the pixels are formed in shape to make brightness constant on a screen irrespective of a position of the observer. Therefore, a length of the non-luminous regions is constant irrespective of a position of the observation region 21 on the liquid crystal panel 10. Accordingly, moire may be reduced when the observer observes the image display device.

<Modification 1>

Hereinafter, Modification 1 of the first embodiment is described. In the first embodiment, each of the pixels 11 of the liquid crystal panel 10 is a parallelogram. A straight line that connects a lower right vertex of a certain pixel to a lower left vertex of an immediately right pixel angularly coincides with the observation region 21. In other words, a straight line that connects a lower right vertex of a certain pixel to a lower left vertex of an immediately right pixel angularly coincides with the lenticular lens 20. On the other hand, in Modification 1, the pixels 11 are geometrically different.

Figure 6:
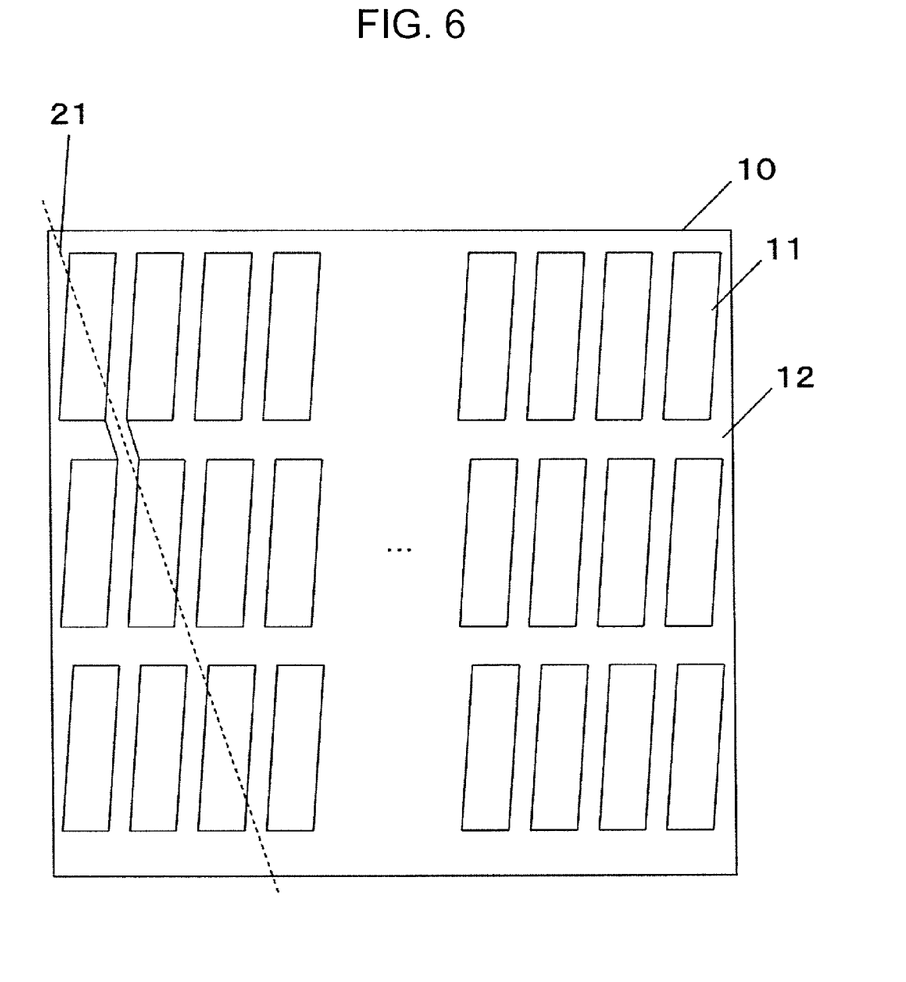
FIG. 6 is a view showing a liquid crystal panel 10 according to Modification 1.

As shown in FIG. 6, each of the pixels 11 of the liquid crystal panel 10 is a parallelogram. A straight line that connects a lower right vertex of a certain pixel to an upper right vertex of a lower pixel angularly coincides with the observation region 21. In Modification 1, the pixels 11 are geometrically different. In other words, a straight line that connects a lower right vertex of a certain pixel to an upper right vertex of a lower pixel angularly coincides with the lenticular lens 20.

A position of the observation region 21 on the liquid crystal panel is changed by a positional relationship among the liquid crystal panel 10, the lenticular lens 20 and a viewpoint of the observer. FIGS. 7 to 10 show positions of the observation region 21 on the liquid crystal panel 10 in four cases under different positional relationships among the liquid crystal panel 10, the lenticular lens 20 and a viewpoint of the observer.

Figure 7:
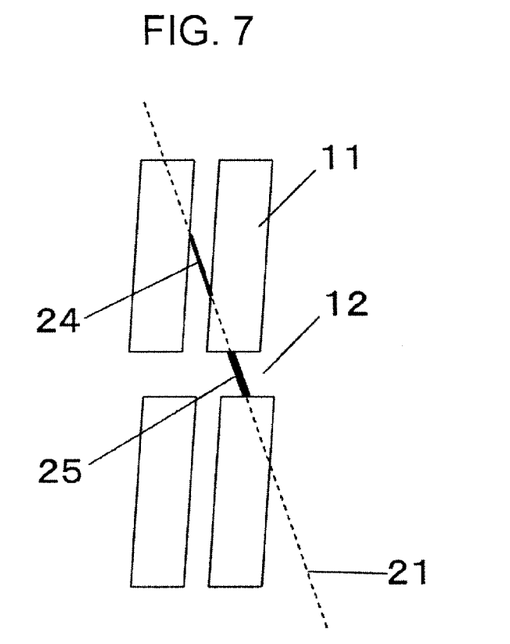
FIG. 7 is a view showing an exemplary non-luminous region on an observation region according to Modification 1.

FIG. 7 shows a state that the observation region 21 passes through a middle of the pixels 11 of the liquid crystal panel 10. In FIG. 7, the observation region 21 bridging between adjacent pixels in the horizontal direction is superposed with the black matrix 12. Since the black matrix 12 is a region without image light emission, this region is referred to as the third non-luminous region 24. The observation region 21 bridging between adjacent pixels in the vertical direction is also superposed with the black matrix 12. This region is referred to as the fourth non-luminous region 25.

Figure 8:
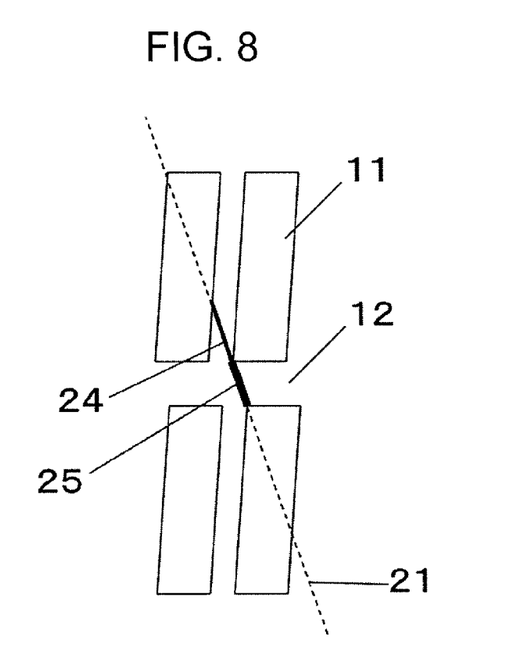
FIG. 8 is a view showing an exemplary non-luminous region on an observation region according to Modification 1.

FIG. 8 shows a state that a position of the observation region 21 on the liquid crystal panel 10 moves to connect the third non-luminous region 24 to the fourth non-luminous region 25.

Figure 9:
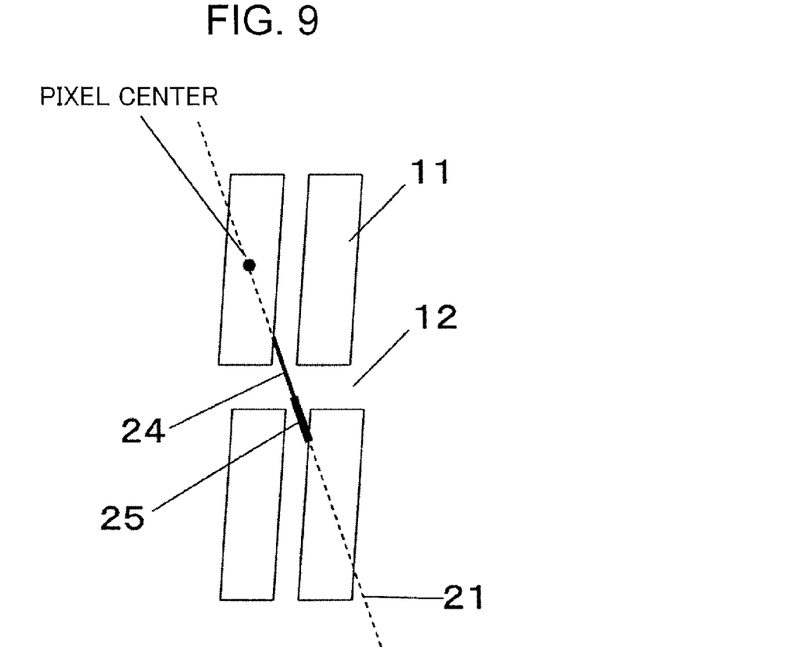
FIG. 9 is a view showing an exemplary non-luminous region on an observation region according to Modification 1.

FIG. 9 shows a state that a position of the observation region 21 on the liquid crystal panel 10 further moves, so that the observation region 21 passes through a center (the black dot) of a pixel 11 of the liquid crystal panel 10. The non-luminous regions are as long as a total length of the third and fourth non-luminous regions 24, 25 in FIG. 3.

Figure 10:
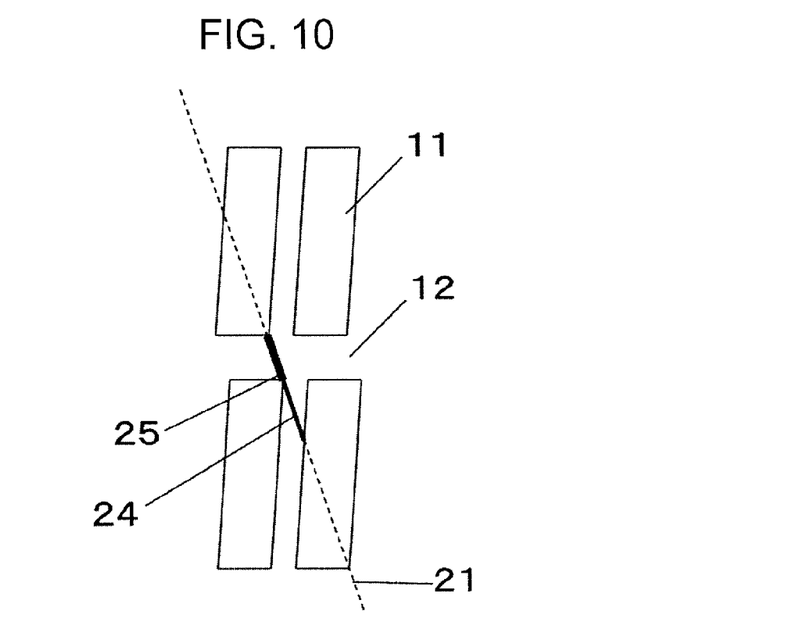
FIG. 10 is a view showing an exemplary non-luminous region on an observation region according to Modification 1.

FIG. 10 shows a state that a position of the observation region 21 on the liquid crystal panel 10 further moves, so that the third non-luminous region 24 starts to be apart from the fourth non-luminous region 25. The non-luminous regions are as long as a total length of the third and fourth non-luminous regions 24, 25 in FIG. 3.

As described above, a length of the non-luminous regions is constant irrespective of a position of the observation region 21. In short, bright and dark stripes are less likely to happen under any positional relationship in FIGS. 7 to 10.

Depending on a position of the observer, the states in FIGS. 7 to 10 are mixed in a screen. Since bright and dark stripes are also less likely to occur in this case, moire is reduced. In short, moire is reduced with few bright and dark stripes in the screen, irrespective of a positional relationship among the liquid crystal panel 10, the lenticular lenses 20 and a viewpoint of the observer.

It is advantageous in Modification 1 that a vertical pixel aperture ratio is also less likely to go down, in addition to the advantages in the first embodiment (FIGS. 1 to 5).

<Second Embodiment>

Figure 11:
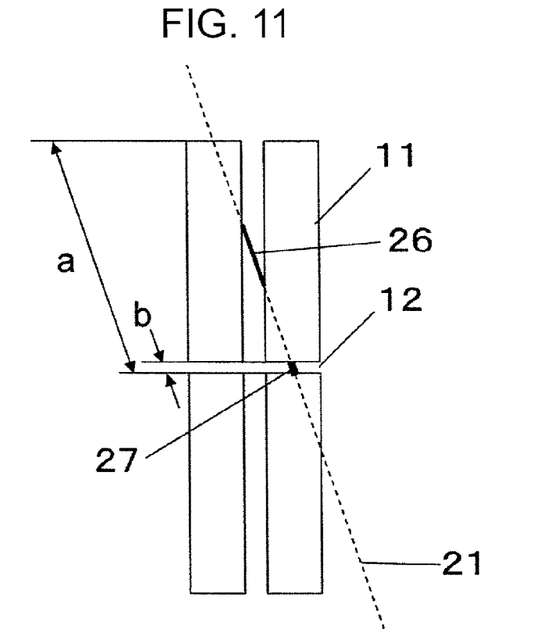
FIG. 11 is a view showing an exemplary non-luminous region on an observation region according to the second embodiment.

Hereinafter, an image display device according to the second embodiment is described with reference to the drawings. FIG. 11 is a view showing the liquid crystal panel 10 as image display means according to the second embodiment.

The pixels of the liquid crystal panel 10 are rectangular, so that a vertical pixel aperture ratio is designed to be large.

FIG. 11 shows a state that the observation region 21 passes through a middle of the pixels 11 of the liquid crystal panel 10. In FIG. 11, the observation region 21 bridging between adjacent pixels in the horizontal direction is superposed with the black matrix 12. Since the black matrix 12 is a region without image light emission, this region is referred to as the fifth non-luminous region 26. The observation region 21 bridging between adjacent pixels in the vertical direction is also superposed with the black matrix 12. This region is referred to as the sixth non-luminous region 27.

Figure 12:
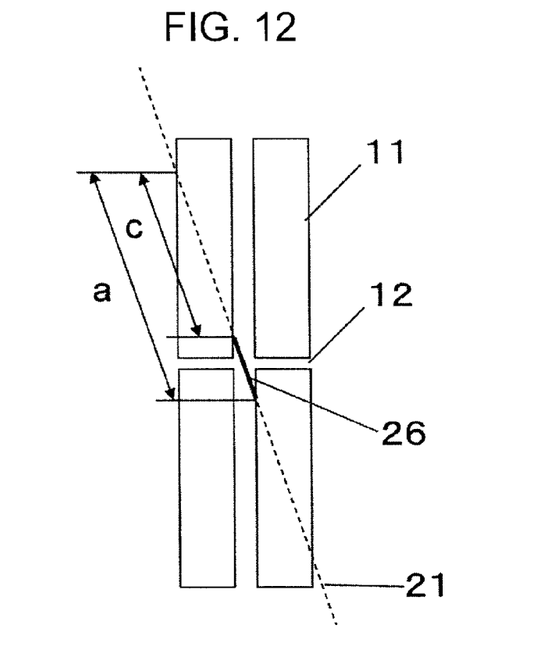
FIG. 12 is a view showing an exemplary non-luminous region on an observation region according to the second embodiment.

FIG. 12 shows a state that a position of the observation region 21 on the liquid crystal panel 10 moves, so that the observation region 21 passes through a center of a pixel 11 of the liquid crystal panel 10. The observation region 21 bridging pixels to be superposed with the black matrix 12 is as long as the fifth non-luminous region 26.

Therefore, a length of the non-luminous regions in FIG. 11 is different from a length of the non-luminous regions in FIG. 12. This means that brightness of the screen is changed by a position of the observer to cause moire.

A horizontal aperture ratio and a vertical aperture ratio of the liquid crystal panel are designated as R1 and R2, respectively.

In FIG. 11, a length of one cycle, in which the observation region 21 is superposed with the pixels 11 and the black matrix 12, is designated as "a". If a length of the sixth non-luminous region 27 is designated as "b", the length of "b" may be represented by using "a" as the following Expression 1.

$$b = a \times (1-R2) \quad \text{[Expression 1]}$$

In FIG. 12, a length of one cycle, in which the observation region 21 is superposed with the pixels 11 and the black matrix 12, is designated as "a". If a length of the observation region 21 that is superposed with a pixel 11 is designated as "c", the length of "c" may be represented by using "a" as the following Expression 2.

$$c = a \times R1 \quad \text{[Expression 2]}$$

By using "b" and "c", a change rate L of brightness between FIGS. 11 and 12 is represented by the following Expression 3.

$$L = b/c = (1-R2)/R1 \quad \text{[Expression 3]}$$

In general, it is said that when a change of brightness (luminance) in a screen becomes no more than 2%, an observer is less likely to feel uncomfortable (c.f. S. S. Stevens: Handbook of Experimental Psychology). If the pixels 11 are formed so that a pixel aperture ratio of the liquid crystal panel 10 satisfies the following Expression 4, a change of brightness (luminance) in a screen is suppressed to be no more than 2% irrespective of a position of the observer so that the observer is less likely to perceive moire.

$$(1-R2)/R1 < 0.02 \quad \text{[Expression 4]}$$

<Modification 2>

Hereinafter, Modification 2 of the second embodiment is described. In the second embodiment, the pixels of the liquid crystal panel 10 are rectangular, so that a vertical pixel aperture ratio is designed to be large. On the other hand, although the pixels of the liquid crystal panel 10 are rectangular, a horizontal pixel aperture ratio is designed to be large in Modification 2.

Figure 13:
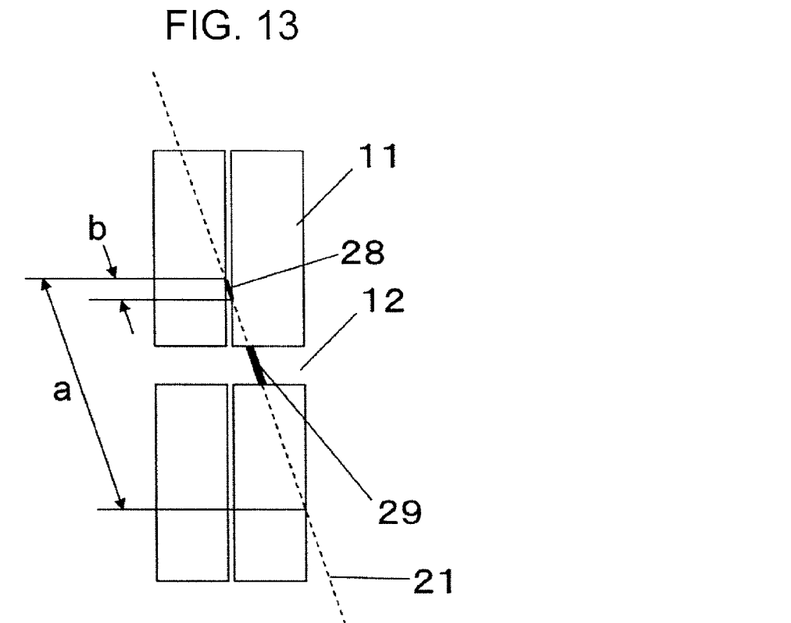
FIG. 13 is a view showing an exemplary non-luminous region on an observation region according to Modification 2.

FIG. 13 shows a state that the observation region 21 passes through a middle of the pixels 11 of the liquid crystal panel 10. The observation region 21, which bridges between adjacent pixels in the horizontal direction, is superposed with the black matrix 12 in FIG. 13. Since the black matrix 12 is a region without image light emission, this region is referred to as the seventh non-luminous region 28. The observation region 21, which bridges between adjacent pixels in the vertical direction, is superposed with the black matrix 12. This region is referred to as the eighth non-luminous region 29.

Figure 14:
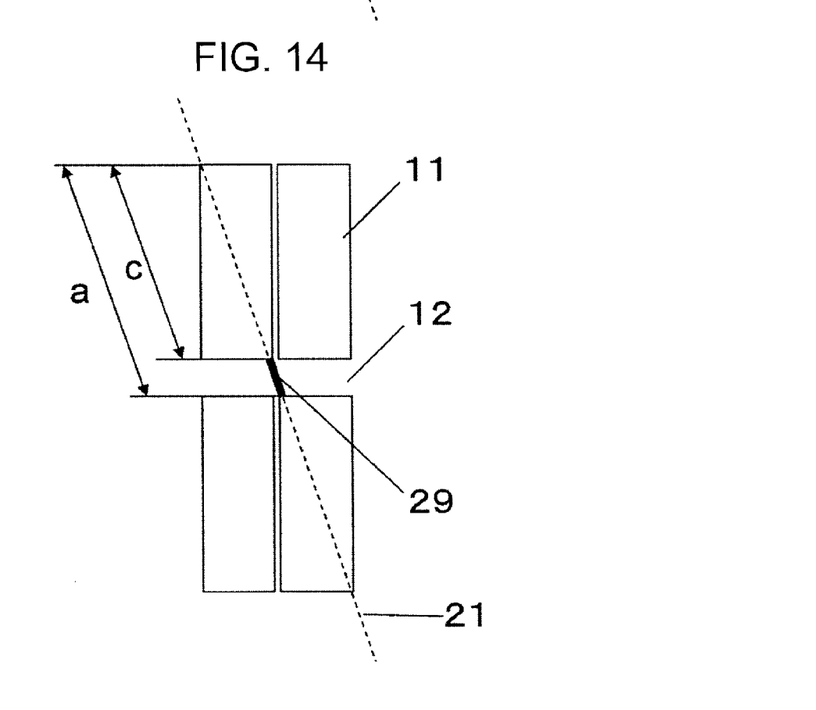
FIG. 14 is a view showing an exemplary non-luminous region on an observation region according to Modification 2.

FIG. 14 shows a state that a position of the observation region 21 on the liquid crystal panel 10 moves, so that the observation region 21 passes through a center of a pixel 11 of the liquid crystal panel 10. The observation region 21, which is superposed with the black matrix 12 to bridge between the pixels, is as long as the eighth non-luminous region 29.

Therefore, a length of the non-luminous regions in FIG. 13 is different from a length of the non-luminous regions in FIG. 14. This means that brightness of the screen is changed by a position of the observer to cause moire.

A horizontal aperture ratio and a vertical aperture ratio of the liquid crystal panel are designated as R1 and R2, respectively.

In FIG. 13, a length of one cycle, in which the observation region 21 is superposed with the pixels 11 and the black matrix 12, is designated as "a". If a length of the sixth non-luminous region 27 is designated as "b", the length of "b" may be represented by using "a" as the following Expression 5.

$$b = a \times (1-R1) \quad \text{[Expression 5]}$$

In FIG. 14, a length of one cycle, in which the observation region 21 is superposed with the pixel 11 and the black matrix 12, is designated as "a". If a length of the observation region 21 that is superposed with the pixel 11 is designated as "c", the length of "c" may be represented by using "a" as the following Expression 6.

$$c = a \times R2 \quad \text{[Expression 6]}$$

By using "b" and "c", a change rate L of brightness between FIGS. 13 and 14 is represented by the following Expression 7.

$$L = b/c = (1-R1)/R2 \quad \text{[Expression 7]}$$

In general, it is said that if a change of brightness (luminance) in a screen becomes no more than 2%, an observer is less likely to feel uncomfortable. If the pixel 11 is formed so that a pixel aperture ratio of the liquid crystal panel 10 satisfies the following Expression 8, a change of brightness (luminance) in a screen is suppressed to be no more than 2% irrespective of a position of the observer so that the observer does not perceive moire.

$$(1-R1)/R2 < 0.02 \quad \text{[Expression 8]}$$

[Other Embodiments]

Although the present invention is described on the basis of the aforementioned embodiments, the dissertation and drawings as a part of the disclosure do not limit the present invention, and include many alternative embodiments, examples, and application techniques, which a person skilled in the art concerned may arrive at, from the present disclosure.

In the embodiments, the image display means is exemplified as the liquid crystal panel. However, the embodiments are not limited to this. For example, an image display panel may be any panel configured to display images by forming pixels, and may be a plasma display or an electroluminescence (EL) panel.

In the embodiments, the image separation means is exemplified as the lenticular lens. However, the image separation means may be any means having functions of separating an image, and may be a parallax barrier. A parallax barrier may be arranged at a light source side of a liquid crystal panel. Or a light source of a liquid crystal panel may be formed in a stripe shape. In these cases, an actual focusing region has a width and is considered as a group of many linear observation regions 21 without light collection of lenses.

The first embodiment may be combined with the second embodiment. For example, the pixel aperture ratio satisfies Expression 4 or 8. The pixel 11 of the liquid crystal panel 10 is a parallelogram. A straight line that connects a lower right vertex of a certain pixel to a lower left vertex of an immediate right pixel may angularly coincide with the observation region 21. Alternatively, the pixel aperture ratio satisfies Expression 4 or 8. The pixel 11 of the liquid crystal panel 10 is a parallelogram. A straight line that connects a lower right vertex of a certain pixel to an upper right vertex of a lower pixel may angularly coincide with the observation region 21.

In the embodiments, lenticular lenses are set so that ridge lines cross the same position of a pixel in an inclined direction. However, inclination of the lenticular lenses is not limited to this, and may be at any angle.

Various techniques described in the context of the aforementioned embodiments mainly include the following features.

The image display device according to one aspect of the embodiments has pixels, each of which is a parallelogram, to form image display means. A straight line that connects a lower right vertex of a target pixel to a lower left vertex of an immediately right pixel angularly coincides with a lenticular lens as image separation means.

According to the aforementioned configuration, shapes of pixels of a display panel are formed so that brightness on a screen visible through separation means such as lenticular lenses becomes constant irrespective of an observation position. The shape advantageously reduces moire when an observer observes the image display device.

In the image display device according to another aspect of the embodiments, rectangular pixels forming image display means have the horizontal aperture ratio R1 and the vertical aperture ratio R2. The horizontal or vertical aperture ratio is controlled so that a variation of brightness on a screen at an observation position becomes smaller than a predetermined value.

According to the aforementioned configuration, with regard to a display panel having a rectangular pixel shape with the horizontal aperture ratio R1 and the vertical aperture ratio R2, the horizontal or vertical aperture ratio is controlled to minimize a variation in brightness on a screen to approximately a small level at which the variation is less likely to be perceived visually and psychologically irrespective of a position of the observer. The shape advantageously reduces moire when the observer observes the image display device.

Industrial Applicability

According to the present invention, a pixel shape is provided to reduce moire so that brightness on a screen visible through the image separation means is constant or become smaller than a predetermined value irrespective of a position of the observer. The present invention also provides an image display device including the pixel shape in image display means.

The invention claimed is:

1. An image display device comprising image display means for displaying images, and image separation means for separating a region in which the images displayed by the image display means are observed, wherein the image display means includes pixels arranged in a horizontal direction and a vertical direction, the image separation means includes elements inclined at a predetermined layout angle to the vertical direction of the image display means, each of the pixels is a quadrangle, and an inclination angle of a straight line that connects a lower right vertex of one of the pixels and a lower left vertex of an immediately right pixel of the one of the pixels coincides with the layout angle of the elements of the image separation means.

2. The image display device according to claim 1, wherein each of the pixels is a parallelogram.

3. An image display device comprising image display means for displaying images, and image separation means for separating a region in which the images displayed by the image display means are observed, wherein
   the image display means includes pixels arranged in a horizontal direction and a vertical direction,
   the image separation means includes elements inclined at a predetermined layout angle to the vertical direction of the image display means,
   each of the pixels is a quadrangle, and
   an inclination angle of a straight line that connects a lower right vertex of one of the pixels and an upper right vertex of a lower pixel coincides with the layout angle of the elements of the image separation means.

4. The image display device according to claim 3, wherein each of the pixels is a parallelogram.

5. An image display device comprising:
   a display panel that displays images, said display panel including pixels arranged in a horizontal direction and a vertical direction; and
   an image separator that separates a region in which the images displayed by the display panel are observed, said image separator including a plurality of lenticular lenses being substantially parallel to the display panel and inclined at a predetermined layout angle to the vertical direction of the display panel,
   wherein each of the pixels is a quadrangle, and an inclination angle of a straight line that connects a lower right vortex of one of the pixels and a lower left vertex of an immediately right pixel of the one of the pixels coincides with the layout angle of the lenticular lenses.

6. The image display device according to claim 5, wherein each of the pixels is a parallelogram.

7. An image display device comprising:
   a display panel that displays images, said display panel including pixels arranged in a horizontal direction and a vertical direction; and
   an image separator that separates a region in which the images displayed by the display panel are observed, said image separator including a plurality of lenticular lenses being substantially parallel to the display panel and inclined at a predetermined layout angle to the vertical direction of the display panel,
   each of the pixels is a quadrangle, and an inclination angle of a straight line that connects a lower right vertex of one of the pixels and an upper right vertex of a lower pixel coincides with the layout angle of the lenticular lenses.

8. The image display device according to claim 7, wherein each of the pixels is a parallelogram.

* * * * *